United States Patent [19]

Shibayama

[11] Patent Number: 5,074,371

[45] Date of Patent: Dec. 24, 1991

[54] SYSTEM AND METHOD FOR AUTOMATICALLY CONTROLLING VEHICLE SPEED TO DESIRED CRUISE SPEED APPLICABLE TO AUTOMATIC TRANSMISSION EQUIPPED VEHICLES

[75] Inventor: Takashi Shibayama, Kanagawa, Japan

[73] Assignee: Nissan Motor Company, Limited, Japan

[21] Appl. No.: 532,541

[22] Filed: Jun. 4, 1990

[30] Foreign Application Priority Data

Jun. 7, 1989 [JP] Japan .................................. 1-144551

[51] Int. Cl.⁵ ............................................ B60K 31/08
[52] U.S. Cl. ...................................... 180/175; 74/859; 180/178; 364/426.04
[58] Field of Search ............... 180/175, 176, 177, 178, 180/179; 364/426.04; 74/859, 866

[56] References Cited

U.S. PATENT DOCUMENTS

| | | | |
|---|---|---|---|
| 4,660,672 | 4/1987 | Katou | 180/178 |
| 4,697,478 | 10/1987 | Matsumoto | 180/179 |
| 4,829,438 | 5/1989 | Etoh | 180/179 |
| 4,845,621 | 7/1989 | Kawata et al. | 180/179 |
| 4,877,101 | 10/1989 | Tada et al. | 180/179 |
| 4,879,655 | 11/1989 | Mori | 180/179 |
| 4,933,859 | 6/1990 | Tsuyama et al. | 180/179 |
| 4,938,604 | 7/1990 | Naito et al. | 180/179 |

FOREIGN PATENT DOCUMENTS 62-62047 9/1985 Japan .

Primary Examiner—David M. Mitchell
Attorney, Agent, or Firm—Lowe, Price, LeBlanc & Becker

[57] ABSTRACT

A system and method for automatically controlling a vehicle's speed to a desired cruise speed, for a vehicle in which a torque converter and an automatic transmission are mounted are disclosed in which, when the vehicle speed is controlled so as to conicide with the desired cruise speed by means of an automatic (vehicle) speed control device (ASCD) associated with the vehicle engine, deviation of a present vehicle speed from a desired cruise speed is derived. When a first predetermined degree of deviation is reached, the lock-up state of a lock-up device in the torque converter is inhibited. When the deviation further reaches a second predetermined degree of deviation, the second predetermined deviation being greater than the first, the automatic transmission is operated to inhibit a maximum speed gear range (e.g. a fourth speed range is downshifted to a third speed gear range). When the vehicle speed is returned to the cruise speed via the inhibition of the maximum speed gear range, the inhibit is released and thereafter lock-up inhibit is also released.

17 Claims, 9 Drawing Sheets

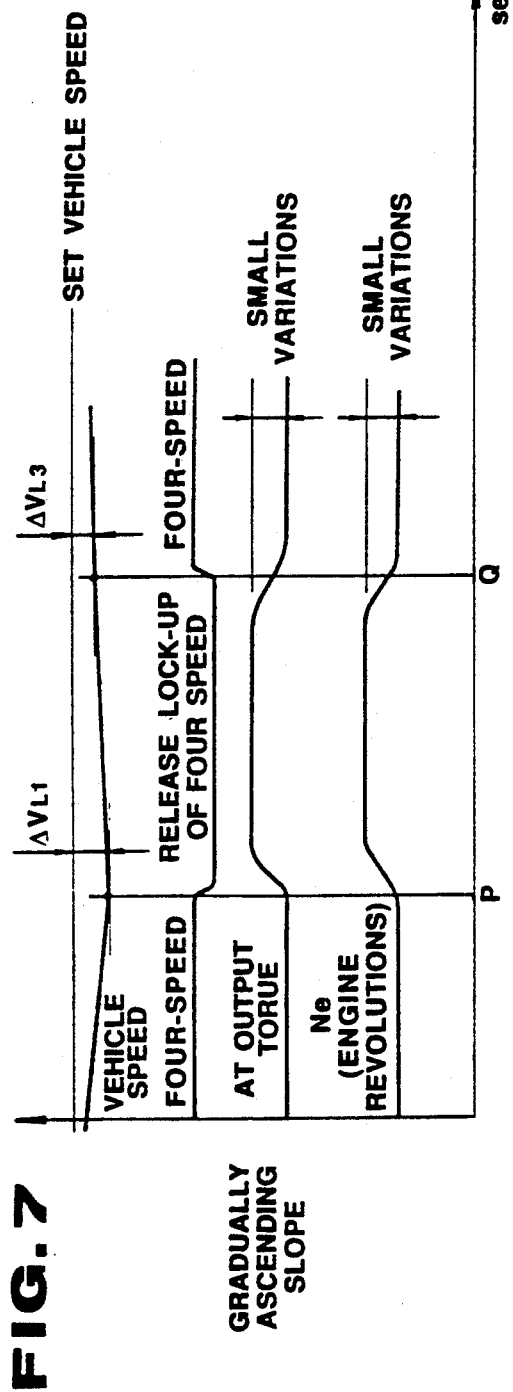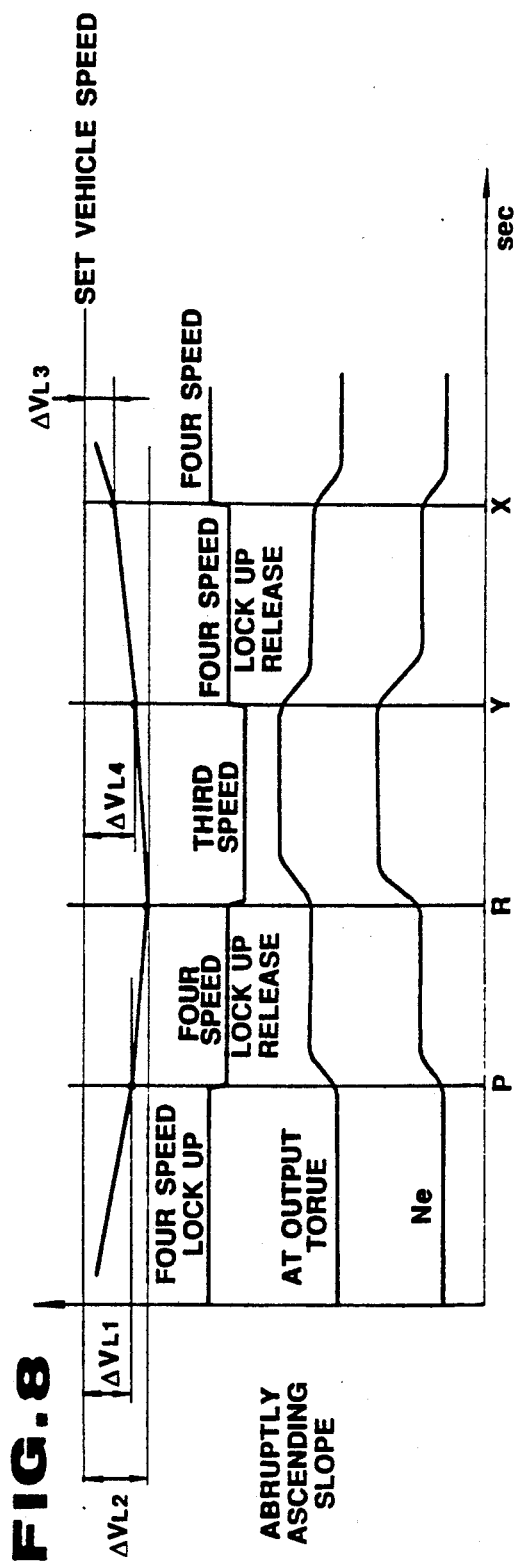

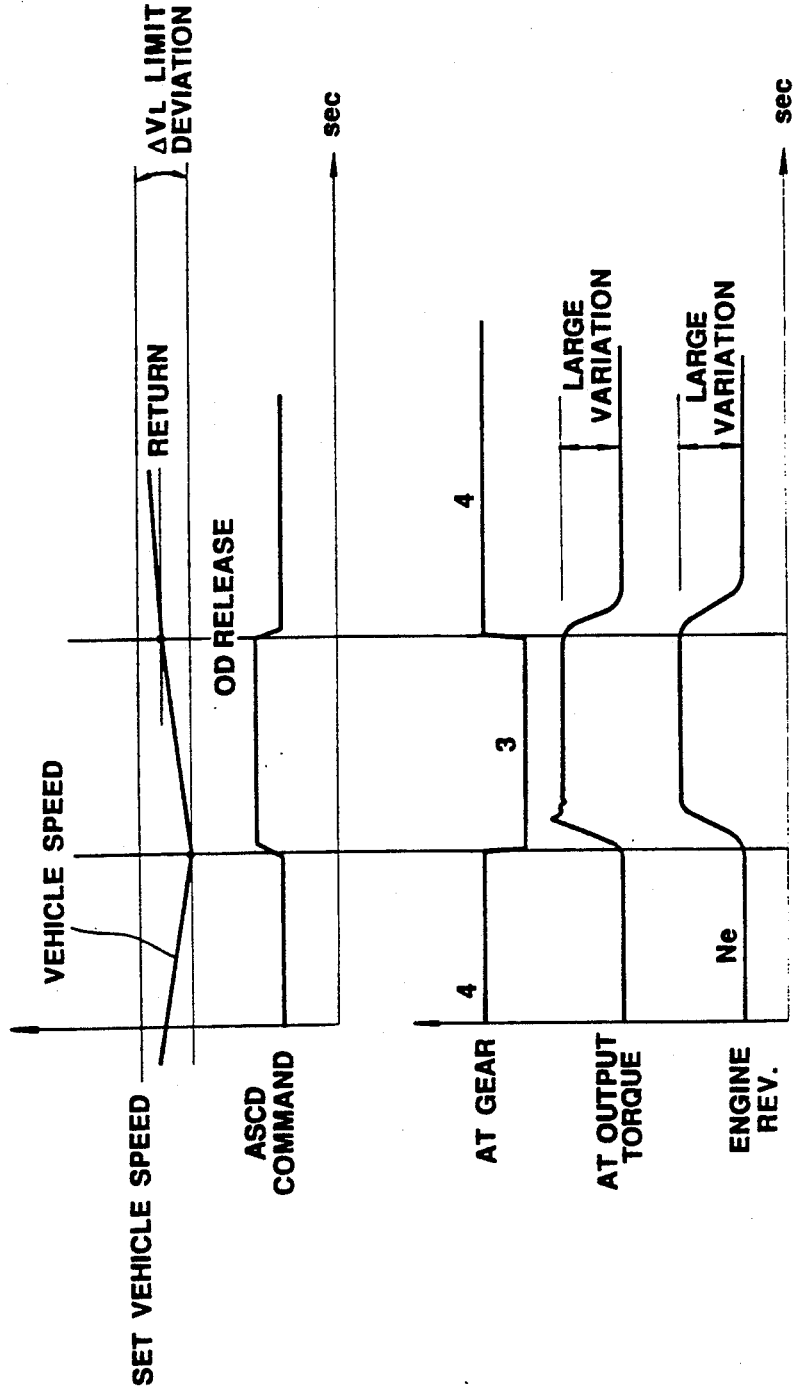

SYSTEM AND METHOD FOR AUTOMATICALLY CONTROLLING VEHICLE SPEED TO DESIRED CRUISE SPEED APPLICABLE TO AUTOMATIC TRANSMISSION EQUIPPED VEHICLES

BACKGROUND OF THE INVENTION (1) Field of the Invention

The present invention relates to a system and method for automatically controlling a vehicle speed to a desired cruise speed applicable to a vehicle in which an automatic transmission is mounted and using a lock up control and gear range change control of the automatic transmission.

(2) Background of the art

Various types of automatic vehicle speed controlling systems have been installed in automotive vehicles for controlling the vehicle speed so as to reach a set cruise speed and maintain the vehicle speed at the set cruise speed without operation of accelerator pedal.

Such automatic vehicle speed controlling systems are called ASCD's (Automatic Speed Control Devices).

A Japanese Publication NISSAN SERVICE WEEKLY INFORMATION (SHUHOU) No. 491 "Introduction to Bluebird; U 11 type" II-141 page (published on October, 1983) discloses an ASCD mounted in an automatic transmission (A/T) mounted in the vehicle in which, when the vehicle runs in an over drive range OD (i.e., in the highest gear range), and vehicle speed is reduced due to increase in the engine load and deviates largely from a set cruise speed, an ASCD control unit produces an OD inhibit signal to an A/T control unit so that the A/T gear range is shifted down to recover the set vehicle cruise speed. (A U.S. Pat. No. 4,697,478 issued on Oct. 6, 1987 also exemplifies an automatic vehicle speed control system applied to an automatic transmission mounted vehicle.)

However, since the A/T gear range is set to downshift to a third gear from the OD range at the OD inhibit signal in order to recover the set vehicle cruise speed in the ASCD mode, large stepwise changes in engine output torque and revolutional speed occur, as shown in FIG. 9. Such changes cause a sudden jolt to the vehicle body so that vehicle comfort is degraded.

SUMMARY OF THE INVENTION

It is an object of the present invention to provide a system and method for automatically controlling a vehicle speed to a desired cruise speed in which the recovery of the vehicle speed can be carried out with less variation in engine output torque and revolutional speed so that no discomfort is afforded to the vehicle occupants.

The above described object can be achieved by a system for a vehicle in which an automatic transmission is mounted, comprising: a) first means for operatively controlling a vehicle speed to a desired cruise speed so that the vehicle speed coincides with the desired cruise speed; b) second means for detecting an instantaneous vehicle speed; c) third means for deriving a deviation between the instantaneous vehicle speed and the desired cruise speed during operation of the first means and determining whether the derived deviation exceeds a first predetermined deviation limit, the third means providing a first signal when determining that the deviation exceeds the first predetermined deviation limit; e) fourth means for deriving a deviation between the instantaneous vehicle speed and derived cruise speed and determining whether the derived deviation exceeds a second predetermined deviation limit, the fourth means providing a second signal when determining that the deviation exceeds the second predetermined deviation and the second predetermined deviation being greater than the first predetermined deviation; f) fifth means responsive to the first signal from the third means for providing a lock-up inhibit signal for a lock-up device installed in a torque converter associated between a vehicular engine and the automatic transmission so as to inhibit the lock-up state of the lock-up device; and g) sixth means responsive to the second signal from the fourth means for providing a maximum speed range inhibit signal for the automatic transmission so as to inhibit a maximum gear range position of the automatic transmission.

The above-described object can also be achieved by providing a method for automatically controlling a vehicle speed to a desired cruise speed using an automatic transmission and torque converter, comprising the steps of: a) operatively controlling a vehicle speed to a desired cruise speed so that the vehicle speed coincides with the desired cruise speed; b) detecting an instantaneous vehicle speed; c) deriving a deviation between the instantaneous vehicle speed and the desired cruise speed during the operation of step a), d) determining whether the derived deviation exceeds a first predetermined deviation limit, e) providing a first signal when determining that the derived deviation exceeds the first predetermined deviation limit; f) determining whether the derived deviation exceeds a second predetermined deviation limit, g) providing a second signal when it is determined that the deviation exceeds the second predetermined deviation limit, the second predetermined deviation limit being greater than the first predetermined deviation limit; h) in response to the first signal provided at e), providing a lock-up inhibit signal for a lock-up device installed in the torque converter associated between a vehicular engine and the automatic transmission so as to inhibit the lock-up state of the lock-up device; and i) in response to the second signal provided at g), providing a maximum speed range inhibit signal for the automatic transmission so as to inhibit a maximum gear range position of the automatic transmission.

BRIEF DESCRIPTION OF THE DRAWINGS

FIGS. 7 and 8 are timing charts indicating states of variation in engine revolutional speed and engine output torque achieved by the present invention.

FIG. 9 is a timing chart indicating states of variation in engine revolutional speed and output torque achieved by a previously proposed automatic vehicle speed controlling system.

DETAILED DESCRIPTION OF THE PREFERRED EMBODIMENT

Reference will hereinafter be made to the drawings in order to facilitate a better understanding of the present invention.

Figure 1:
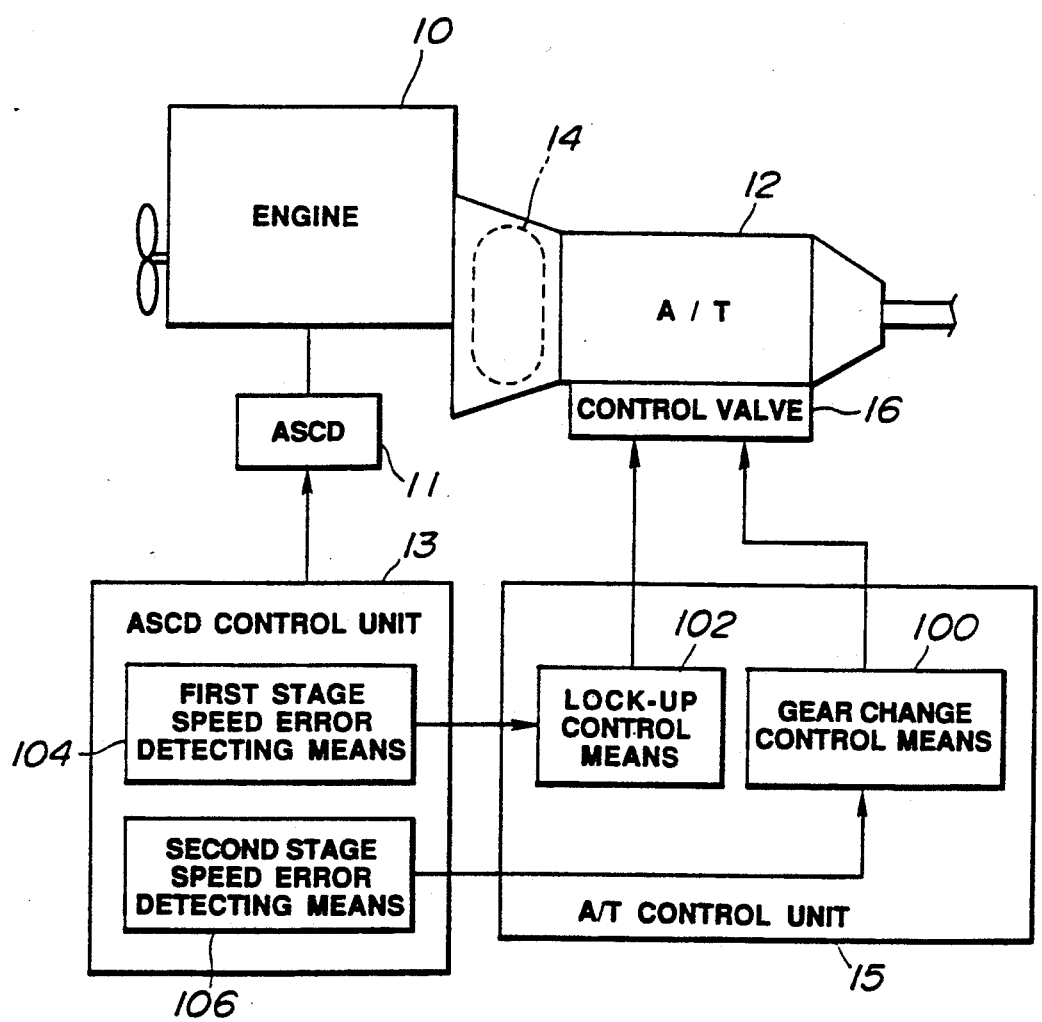
FIG. 1 is a circuit block diagram of a system for automatically controlling vehicle speed to a desired cruise speed in a preferred embodiment according to the present invention.

FIG. 1 shows a preferred embodiment of a system for automatically controlling vehicle speed to a desired cruise speed applicable to an automatic transmission equipped vehicle.

The output revolutions of an engine 10 are transmitted to an automatic transmission 12 via a torque converter 14. A gear changing in the automatic transmission 12 is carried out by means of hydraulic pressure supplied from a control valve 16.

An automatic speed control device (ASCD) 11 is installed on the engine 10 and is actuated in response to a control signal derived from an ASCD control unit 13. The ASCD control unit 13 outputs the control signal in response to a command signal derived from an ASCD operating unit (not shown). The ASCD 11 connected with the ASCD operating unit and ASCD control unit is exemplified by U.S. Pat. No. 4,829,438 issued on May 9, 1989, which is hereby incorporated by reference.

In the ASCD 11, an opening angle of a throttle valve installed in the engine 10 is automatically controlled during automatic cruise control so that vehicle speed is held at a constant cruise speed.

In the automatic transmission 12, the control signal output from the A/T control unit 13 is used to actuate the control valve 16. The gear changing hydraulic pressure output from the control valve 16 is used to engage and release a plurality of frictional elements incorporated in a change gear row of the automatic transmission 12 so that gear change control of the automatic transmission may be carried out.

The change gear row of the automatic transmission 12 includes: a front planetary gear group 17 having a front sun gear 17s, a front pinion gear 17p, a front internal gear 17i, and a front planet carrier 17c; and a rear planetary gear group 18 having a rear sun gear 18s, a rear pinion gear 18p, a rear internal gear 18i and a rear planet carrier 18c. These two groups of planetary gears 17, 18 are arranged in a tandem configuration. (Refer to FIG. 3).

A power train constituting the above gear change row includes the frictional elements of a reverse clutch R/C connecting an input shaft 19 and the front sun gear 17s, a high clutch H/C connecting the input shaft 19 and the front planet carrier 17c, a forward clutch F/C connecting a front planet carrier 17c and rear internal gear 18i, a band brake B/B fixing the front sun gear 17s to a side of the transmission housing and a low and reverse brake L & R/B fixing the front planet carrier 17c to a side to the housing.

Furthermore, a forward one-way clutch F/O·C between the forward clutch F/C and rear internal gear 18i is installed. A low one-way clutch L/O·C is installed between the front planet carrier 17c and the housing. An overrun clutch O·R/C is arranged in parallel to the forward one-way clutch F/O·C between the front planet carrier 17c and rear internal gear 18i.

Figure 3:
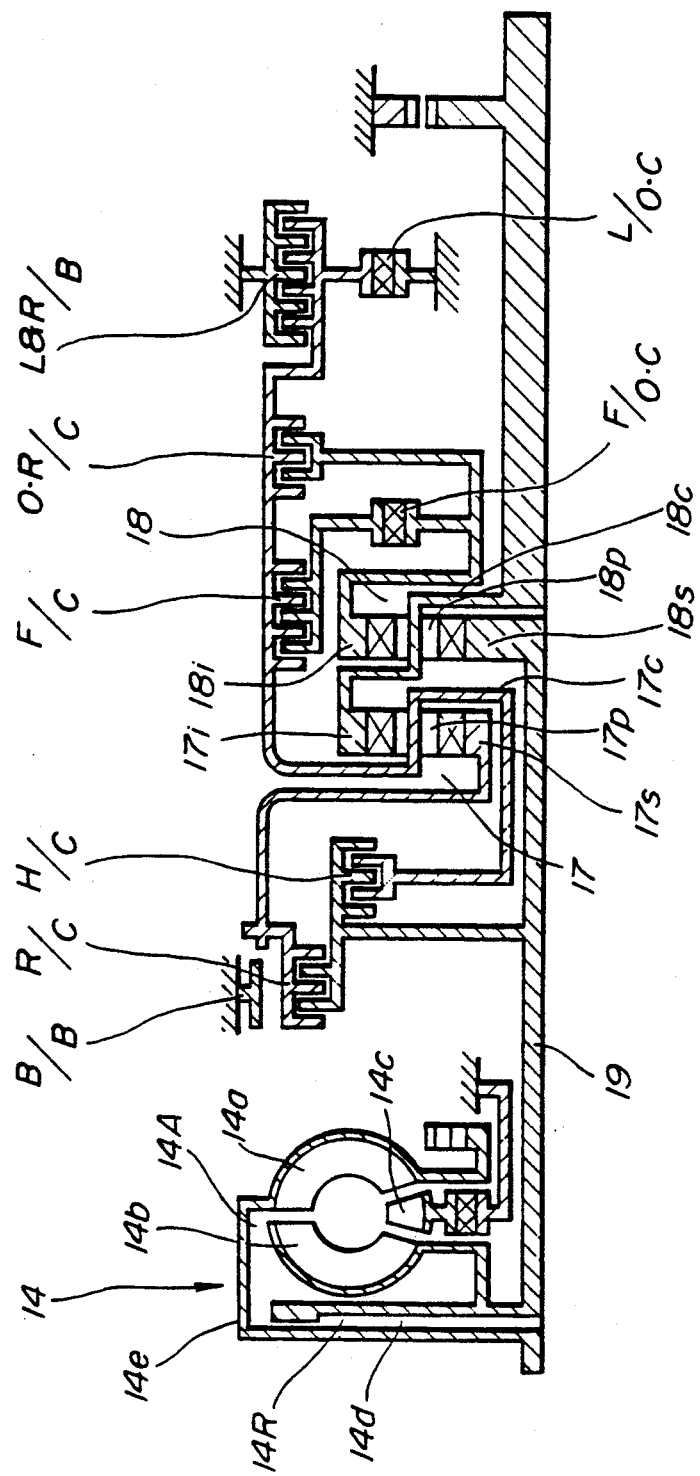
FIGS. 3A and 3B are integrally a simplified layout of a power train of an automatic transmission to which the automatic vehicle speed controlling system of the preferred embodiment shown in FIG. 1 is applied.

The torque converter 14, as shown in FIG. 3, includes a lock-up piston 14d constituting a lock-up device connected to the input shaft 19 when the lock-up piston 14d is engaged with a converter cover 14e so as to be directly connected to the engine 10. In addition the torque converter includes a pump impeller 14a, turbine runner 14b, and a stator 14c. When the lock-up piston 14d is released (not shown), a fluid joint function is achieved by means of the torque converter 14 (including a torque increasing function by means of the stator 14c).

The following table 1 lists change over of the ranges of the gears of the power train described above.

A symbol O denoted in the table indicates an engaged state and a symbol X denotes a released state.

In addition, fourth gear range is set as an overdrive (OD) position.

TABLE 1

| Gear range | | R/C | H/C | F/C | B/B | L & R/B |
|---|---|---|---|---|---|---|
| Reverse | | O | X | X | X | O |
| Forward | 1 | X | X | O | X | X |
| | 2 | X | X | O | O | X |
| | 3 | X | O | O | X | X |
| | 4 | X | O | O | O | X |

The forward one-way clutch F/O·C is free during normal revolution of the rear internal gear 18i with respect to the front planet carrier 17c and is locked during the reverse revolution of the rear internal gear 18i. The low one way clutch L/O·C is free during normal revolution of the front planet carrier 17c and is locked during the reverse revolution thereof.

Figure 2A:
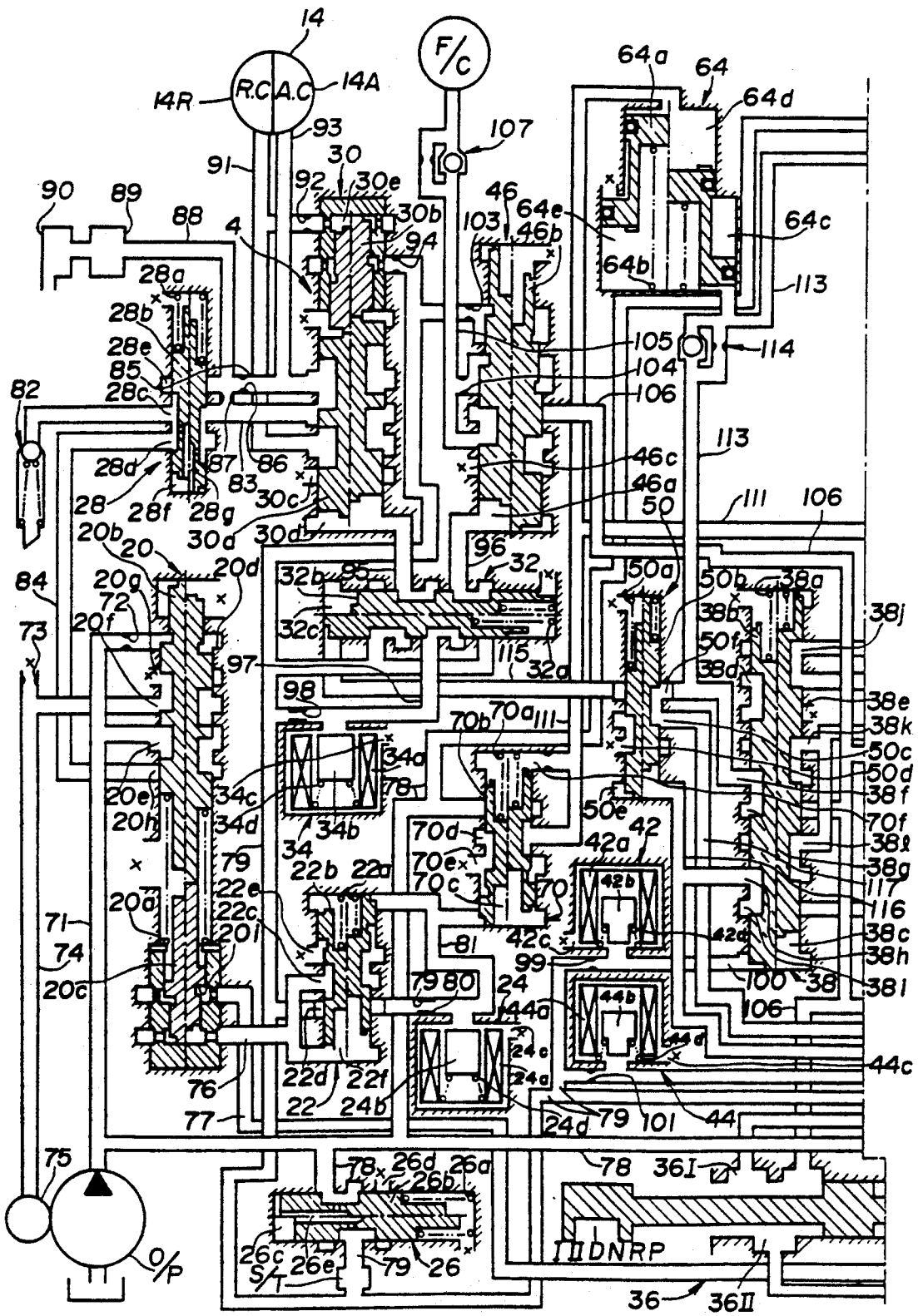
FIG. 2 is a circuit block diagram of control valve system in an automatic transmission to which the automatic vehicle speed controlling system of the preferred embodiment shown in FIG. 1 is applied.
Figure 2B:
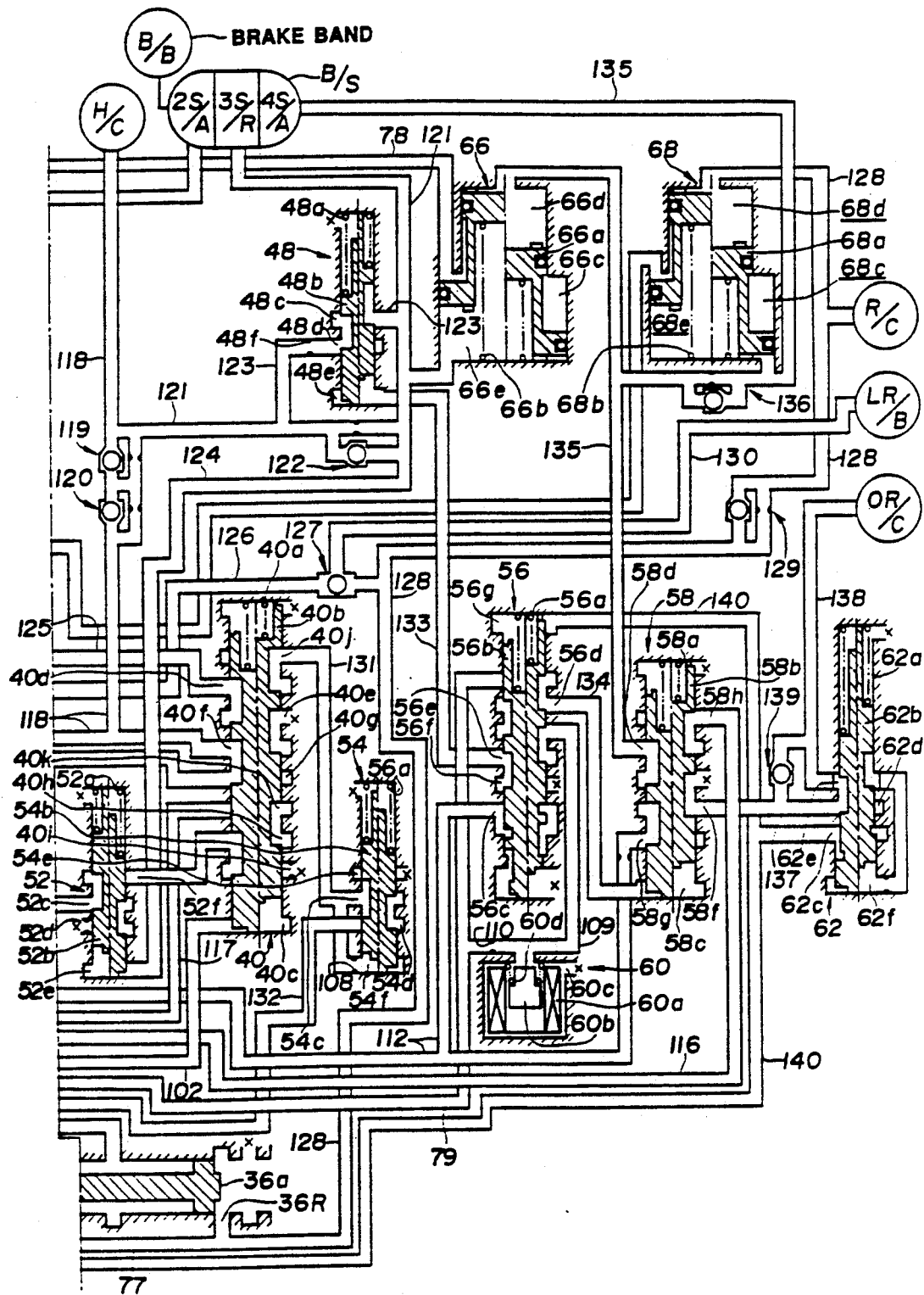

FIGS. 2A and 2B integrally show a hydraulic control circuit of the above described control valve 16. The control valve 16 includes a pressure regulator valve 20, pressure modifier valve 22, line pressure solenoid 24, pilot valve 26, torque converter regulator valve 28, lock-up control valve 30, shuttle valve 32, lock up solenoid 34, manual valve 36, first shift valve 38, second shift valve 40, first shift solenoid 42, second shift solenoid 44, forward clutch control valve 46, 3-2 timing valve 48, 4-2 relay valve 50, 4-2 sequence valve 52, first range pressure reduction valve 54, shuttle valve 56, overrun clutch control valve 58, third range shift solenoid 60, overrun clutch reduction valve 62, second range servo apply pressure accumulator 64, third range servo release pressure accumulator 66, fourth speed servo apply pressure accumulator 68, and an accumulator control valve 70.

Each component of the control valve 16 is connected to each frictional element of the reverse clutch R/C, high clutch H/C, forward clutch F/C, brake band B/B, low and reverse brake L R/B, and overrun clutch O·R/C and to the oil pump O/P. A combination of changeovers between the first and second shift valves 38 and 40 causes supply and stoppage of hydraulic fluid to each frictional element.

The function and construction of each component of the control valve 16 is exemplified by Japanese Patent Application First Publication Showa 62-62047 published on Mar. 18, 1987, the disclosure of which is hereby incorporated by reference.

The band brake B/B is operated upon by means of a band servo B/S. The band servo B/S includes a second speed range servo pressure applying chamber 2S/A, a third speed range servo pressure release chamber 3S/R, and fourth speed range pressure applying chamber 4S/A. Hydraulic pressure is supplied to the second speed range servo applying pressure chamber 2S/A to tightly engage the band brake B/B. Then, when the hydraulic pressure is supplied to the third speed range servo release pressure chamber 3S/R, the band brake B/B is released. Furthermore, the hydraulic pressure is supplied the fourth speed servo applying chamber 4S/A under such a state as described above so as to cause the band brake B/B to be engaged.

The A/T control unit 15 inputs various vehicle running conditions such as a vehicle speed signal, throttle valve opening angle signal, operating liquid temperature. A solenoid drive signal output from the control unit 15 actuates the first and second range shift solenoids 42, 44 to turn them on and off, thus switching the first and second shift valves 38, 40.

That is to say, when the first and second solenoids 42, 44 are turned ON, pilot pressure is supplied to the first and second shift valves 38, 40 so that the valve positions thereof are placed at their upper positions (right half of the valve as illustrated in FIG. 2). When the first and second shift solenoids 42, 44 are turned OFF, the pilot pressure is drained so that the first and second shift valves 38, 40 are placed at their lower positions (left half positions in FIGS. 3A and 3B).

The first and second shift valves 38, 40 are switched ON and OFF according to each gear change range as shown in TABLE II.

TABLE II

| Gear Pos. | SOLENOID | |
| --- | --- | --- |
| | First Shift Solenoid | Second Shift Solenoid |
| 1st | ON | ON |
| 2nd | OFF | ON |
| 3rd | OFF | OFF |
| 4th | ON | OFF |

A lock-up control of the above-described torque converter 14 is such that torque converter pressure supplied from a pressure regulator valve 20 as shown in FIGS. 3A and 3B is supplied via a torque converter regulator 28 and lock-up control valve 30 to an applying chamber 14A of the torque converter 14 so as to lock up the torque converter 14 and the torque converter pressure is supplied to a release chamber 14R of the torque converter 14 so as to release a lock-up control.

The supply of the torque converter pressure to the applying chamber 14A or to the release chamber 14R is switched when the lock-up control valve 30 is switched by means of a change pressure supplied from the lock-up solenoid 34.

Hence, the above-described A/T control unit 15 includes gear range controlling means 100 outputting ON and OFF signals to the first and second shift solenoids 42, 44 and lock up controlling means outputting the ON and OFF signals to the lock up solenoid 34. The gear change controlling means 100 carries out gear changes so that lock up control is carried out by means of lock up controlling means 102.

Figure 4:
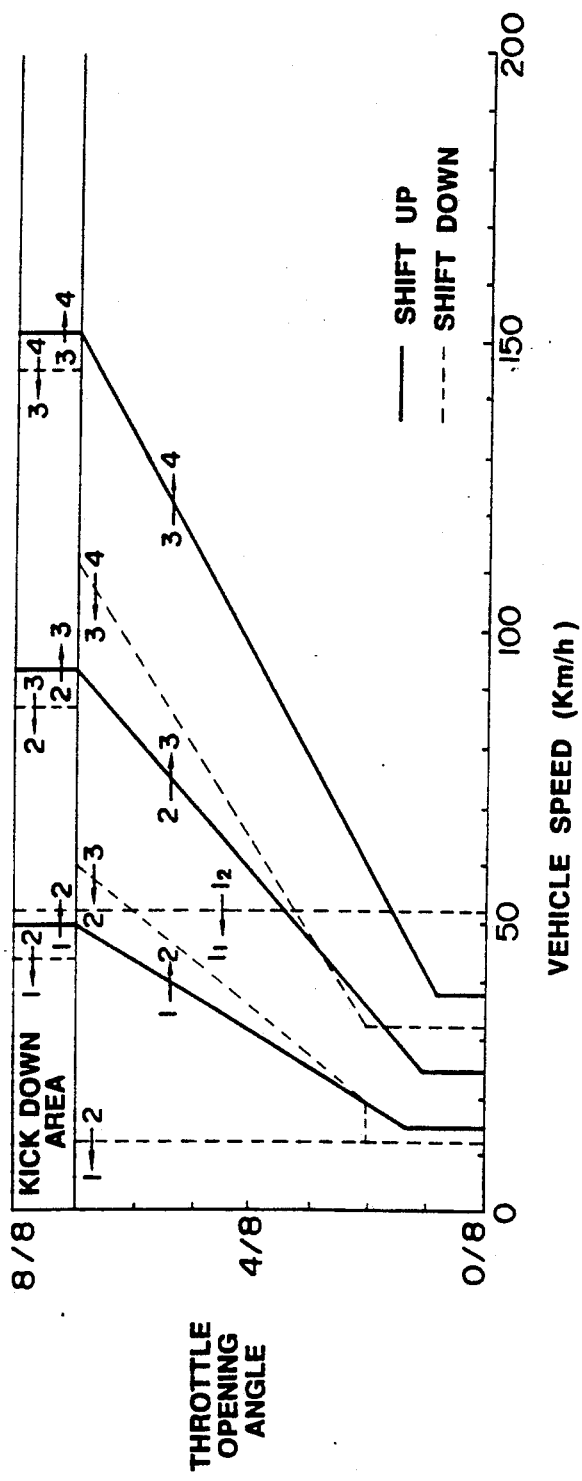
FIG. 4 is an explanatory view of a shift schedule of the automatic transmission shown in FIG. 2.

The ON and OFF switchings of the first and second shift valves 38, 40 are controlled in accordance with a shift schedule shown in FIG. 4 determined according to the vehicle speed and opening angle of the throttle valve.

Figure 5:
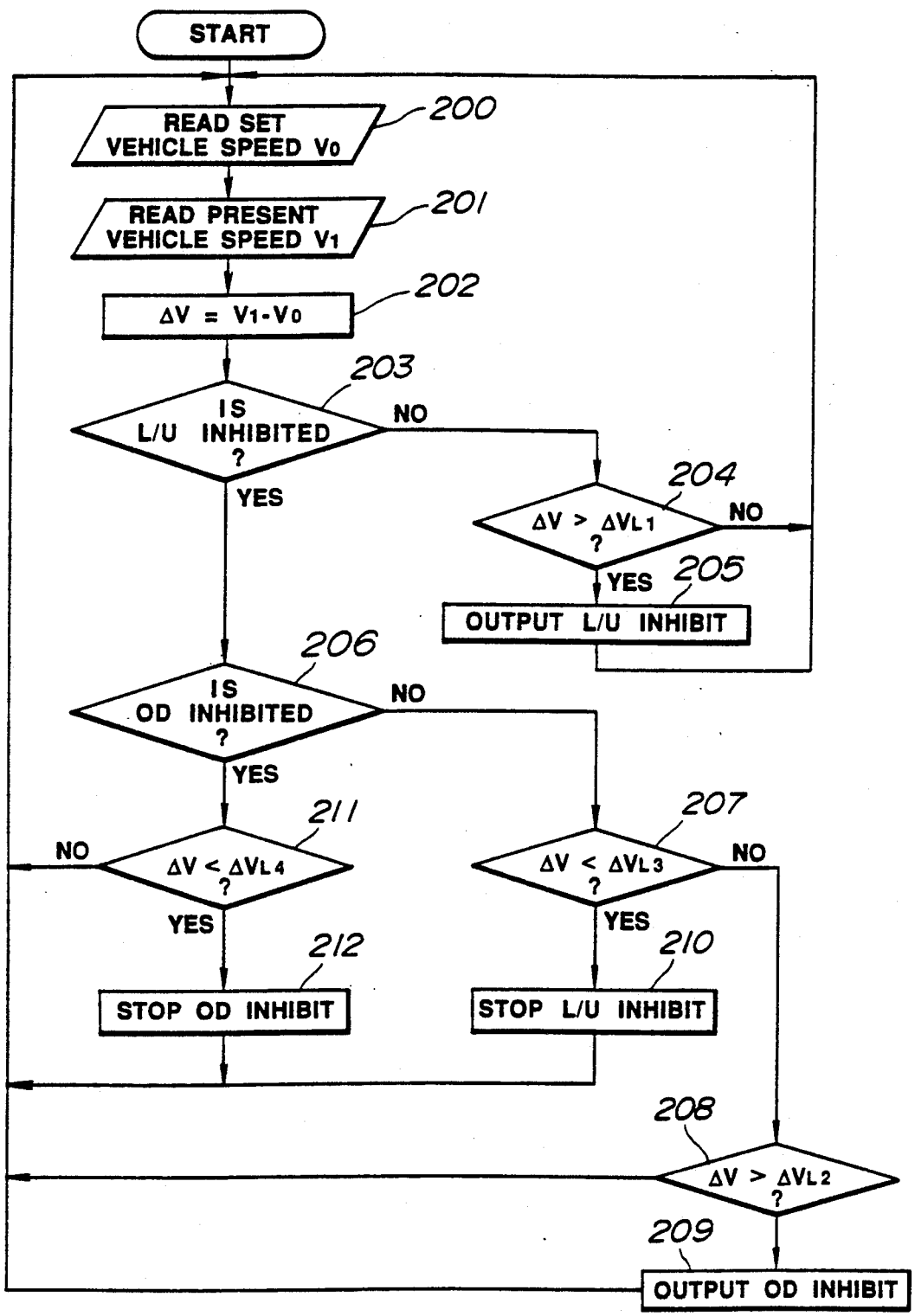
FIG. 5 is an operational flowchart executed by the automatic vehicle speed controlling system of the preferred embodiment.

In the preferred embodiment, as is shown in FIG. 5, when cruise control is carried out in the ASCD 11 by means of the ASCD control unit 13, the ASCD 13 includes first stage speed error detecting means 104 detecting that deviation from the set vehicle speed has reached a predetermined value (speed deviation of a lock up allowance limit $\Delta V_{L1}$) and second stage speed error detecting means 106 detecting that deviation has reached a second predetermined value (speed deviation of an OD allowance limit $\Delta V_{L2}$), with $\Delta V_{L1}$ being less than $\Delta V_{L2}$ ($\Delta V_{L1} < \Delta V_{L2}$).

In a case where the first stage speed error detecting means 104 detects that the vehicle speed reaches the predetermined value, a lock up inhibit signal is output to the lock up controlling means 102 of the A/T control unit 15 from the first stage speed error detecting means 104. In a case where the second stage speed error detecting means 106 detects that the vehicle speed has reached the predetermined value, the OD inhibit signal is supplied to the gear range controlling means 100 of the A/T control unit 15 from the second stage speed error detecting means 106.

In a case where a lock up recovery limit speed deviation $\Delta V_{L3}$ is detected by means of the first stage speed error detecting means 104, a signal to release the lock up inhibit (stop the lock up inhibit) is supplied to the lock up controlling means 102. In a case where an OD recovery limit speed deviation $\Delta V_{L4}$ is detected by means of the second stage speed error detecting means 106, a signal to release the OD inhibit (stop the 0D inhibit) is supplied to the gear range controlling means 100 ($\Delta V_{L3} < \Delta V_{L4}$).

An operation of the automatic vehicle speed controlling system will be described in detail herebelow with reference to FIGS. 5 and 6.

FIG. 5 shows a flowchart of a program executed by the ASCD control unit 13.

Figure 6:
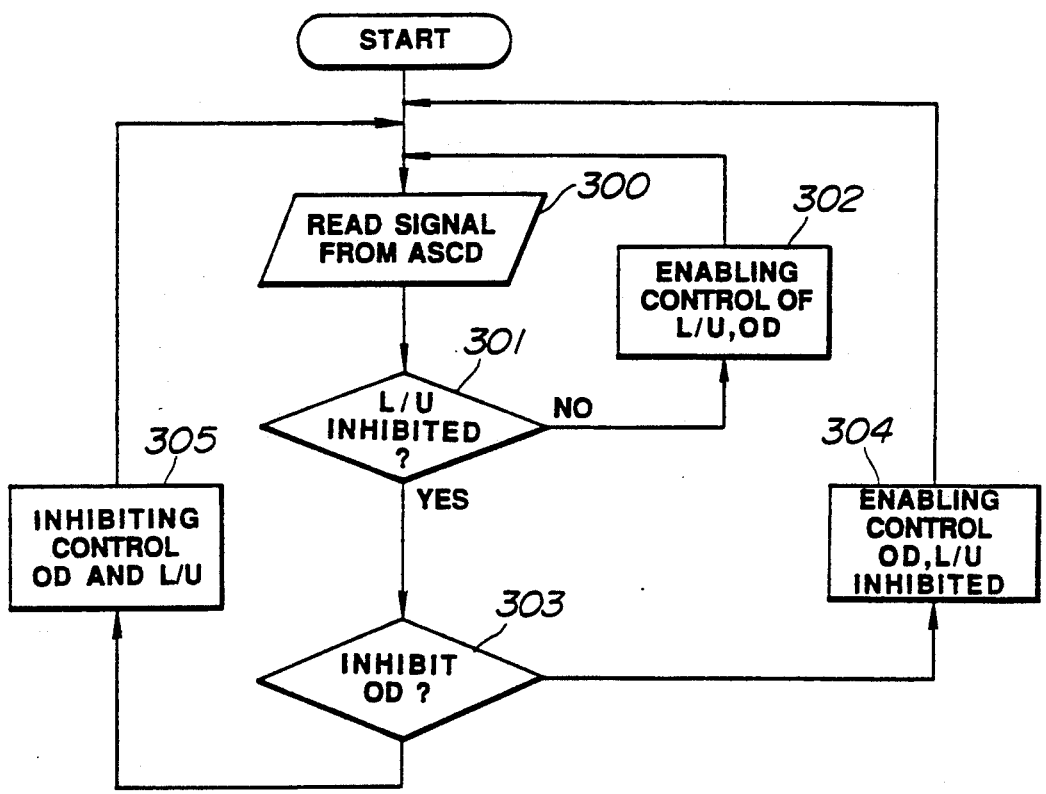
FIG. 6 is an operational flowchart executed by the automatic vehicle speed controlling system in the preferred embodiment.

FIG. 6 shows the flowchart of a program executed by the A/T control unit 15.

In the flowchart shown in FIG. 5, the vehicle speed $V_O$ at which the vehicle cruises is set in the ASCD 11 in a step 200.

In a step 201, the present vehicle speed $V_1$ is read by means of a vehicle speed sensor (not shown).

In a step 202, the deviation ($\Delta V = V_0 - V_1$) between the set vehicle speed $V_o$ and present vehicle speed $V_1$ is calculated. (It is noted that deviation as used in the specification means $V_o - V_1$).

In a step 203, the ASCD control unit 13 determines whether lock up is presently being inhibited, in other words, whether the lock up piston 14d is presently released. If NO, i.e., during a lock up operation, the routine goes to a step 204 in which the above described $\Delta V$ and the lock up allowance limit speed $\Delta V_{L1}$ are compared to determine whether $\Delta V > \Delta V_{L1}$.

In a case where the ASCD control unit 13 determines YES, i.e., determines that the present deviation is larger than the lock up allowance limit speed deviation, the routine goes to the step 205 in which the lock up inhibit signal is supplied to the A/T control unit 15. In a case where NO is determined in the step 204, the routine returns to the step 200 leaving control under the lock up state since the deviation is within the allowance limit.

On the other hand, in a case where the ASCD control unit 13 determines YES in a step 203, the routine advances to step 206 since the lock up release is already executed. In the step 206, the ASCD control unit 13 determines whether the OD range is being inhibited. In case of a NO determination, such as when the OD range is engaged, in a step 207, the present deviation $\Delta V$ is compared with the lock up recovery limit speed deviation $\Delta V_{L3}$ to determine whether $\Delta V < \Delta V_{L3}$.

If the ASCD control unit 13 determines NO in the step 207, the routine goes to a step 208 since the deviation is out of the allowance limit range to recover the set speed. In the step 208, the above described deviation $\Delta V$ is compared with the OD allowance limit speed deviation $\Delta V_{L2}$ to determine whether $\Delta V > \Delta V_{L2}$.

If YES in the step 208, the routine goes to a step 209 in which the OD inhibit signal is output to the A/T control unit 15. If NO in the step 208, the routine returns to the step 200 with the OD state being continued.

In addition, in a case where the ASCD control unit 13 determines YES, i.e,. determines that the present deviation $\Delta V$ falls within the lock up recovery limit speed deviation $\Delta V_{L3}$ (in the step 207). In this case, the routine goes to a step 210 in which a signal indicative of a halt of lock up inhibit is output to the A/T control unit 15.

On the other hand, the ASCD control unit 13 determines YES in the step 206 (the OD is presently being inhibited). In this case, in a step 211, the present deviation $\Delta V$ is compared with an OD recovery limit speed deviation $\Delta V_{L4}$ to determine whether $\Delta V < \Delta V_{L4}$. If YES in the step 211, the ASCD control unit 13 determines that the present deviation falls in the OD recovery limit speed deviation $\Delta V_{L4}$. In this case, the routine goes to a step 212 in which a signal indicative of a halt of the OD inhibit is outputted to the A/T control unit 15.

In addition, in a case where the ASCD control unit 13 determines NO in the step 211, the routine returns to the step 200.

FIG. 6 is the flowchart executed by the A/T control unit 15.

In a step 300, a signal derived from the ASCD control unit 13 is read. The A/T control unit 15 determines whether the lock up inhibit signal is issued in a step 301. In a case where the A/T control unit 15 determines NO lock up inhibit signal is produced, the routine goes to a step 302 in which a signal enabling the lock up and OD is outputted to the control valve 16 of the automatic transmission 12.

If, in the step 301, the AT control unit 15 determines YES, the routine goes to a step 303 in which the AT control unit 15 determines whether the OD inhibit signal is issued from the ASCD control unit 13. If NO in the step 303, the routine goes to a step 304 in which both lock up inhibit signal and OD enabling signal are output to the control valve 16.

On the other hand, if YES in the step 303, the routine goes to a step 305 in which signals inhibiting both lock up and OD are output to the control valve 16.

As appreciated from FIGS. 5 and 6, in a case where engine load is increased during travel on a gradually ascending slope, for example, and the vehicle speed is reduced since the cruise speed set by the automatic vehicle speed controlling system (ASCD) 11 cannot be maintained, the A/T control unit 15 determines, if the A/T is in the lock up state, whether the present deviation reaches the lock up allowance limit speed deviation $\Delta V_{L1}$ in a step 204.

If the present deviation reaches the lock up allowance limit speed deviation $\Delta V_{L1}$, the A/T control unit 15 outputs the lock up inhibit signal to release the lock up.

Hence, as shown in a timing chart of FIG. 7, the lock up is released under the OD range state at the first stage P and by the lock up release the engine output torque and engine revolutional speed are increased and the recovery of the vehicle speed is carried out.

Since the amount of the increase of output torque and engine revolutional speed with lock up release, variation are smaller than those during downshift from OD to the third range and the occurrence of shock in the A/T can extremely be reduced.

Next, since in a case Q where the vehicle speed is recovered due to the lock up release and the speed deviation reaches $\Delta V_{L3}$, the lock up inhibit is stopped at the step 210 and the lock up clutch is reenergized and output torque is reduced to avoid unnecessary further acceleration .

In addition, in a case where the vehicle runs on an abruptly ascending slope as shown in FIG. 8, the load acting upon the engine 10 becomes further increased. If the deviation reaches $\Delta V_{L2}$, the OD inhibit signal is outputted at a second stage R in the step 209 so that the A/T 12 is downshifted to the third speed range. Hence, the vehicle speed is recovered having higher torque. Since the engine revolutional speed and output torque have both already increased to some degree due to the lock up release at the first stage P, variations in the engine revolutional speed and output torque during the downshift can be supressed between the first stage P and second stage R.

Since in a case where the vehicle speed is recovered due to the OD release at the second stage R and the deviation of the vehicle speed reaches the predetermined deviation $\Delta V_{L4}$, the ASCD control unit 15 determines YES in the step 206. The signal indicating the halt of the OD inhibit in the step 212 is issued and the A/T 12 is again set in the fourth speed range.

Since the setting of the fourth speed range in this case is maintained under the locked up state, the variation of the engine revolutional speed and engine torque can be reduced.

Furthermore, in another case where the vehicle speed is recovered and the deviation reaches $\Delta V_{L3}$, lock up only is carried out under the fourth speed range (this case corresponds to case Q shown in FIG. 7). Therefore, the variation range of the engine revolutional speed and output torque can be reduced.

Hence, since the lock up control of the torque converter 14 is carried out midway through the transfer from OD (fourth speed) to the OD inhibit (third speed) or vice versa in the preferred embodiment, abrupt variation of engine revolutional speed and output torque can be prevented and smooth changing of the gear speed range can be achieved.

Consequently, in a case where cruise speed running is carried out by means of the automatic vehicle speed controlling system 11, the shock generated during recovery of the vehicle speed can remarkably be reduced and vehicle comfort can be remarkably improved.

As described hereinabove, since, in the automatic vehicle speed controlling system according to the present invention, when the deviation of the vehicle speed with respect to the set cruise speed becomes large the deviation is detected by the first stage speed error detecting means and the lock up inhibit signal is derived from the lock up controlling means and sent to the lock up device, the lock up device is inhibited and the engine revolutional speed and output torque can be increased by a relatively minor degree.

In addition, since when the deviation reaches a deviation value larger than the vehicle speed deviation detected by the first stage speed error detecting means, the deviation is detected by the second stage speed error detecting means and the maximum speed range inhibit signal is output from the speed controlling means to the automatic transmission, the automatic transmission is downshifted and the engine revolutions and output torque are furthermore increased. Since the lock up release is carried out by the first stage speed error detecting means, the output torque is increased to some degree so that the variation of the output torque at the time when the output torque is increased due to the shift down can be reduced with smooth recovery of the set cruise speed.

During the recovery of the vehicle speed from the maximum gear range inhibit state and lock up inhibit state, the maximum speed range inhibit by means of the gear change controlling means is released and the lock up inhibit is released by means of the lock up controlling means so that resetting to the maximum speed range can be carried out under the lock up release state, revolution and torque variation during recovery can also remarkably be reduced.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for a vehicle in which an automatic transmission is mounted, comprising:
   a) first means for operatively controlling vehicle speed to a desired cruise speed so that the vehicle speed coincides with the desired cruise speed;
   b) second means for detecting an instantaneous vehicle speed;
   c) third means for deriving a deviation between the instantaneous vehicle speed and the desired cruise speed during operation of the first means and determining whether the derived deviation exceeds a first predetermined deviation limit, the third means providing a first signal when determining that the deviation exceeds the first predetermined deviation limit;
   d) fourth means for deriving the deviation between the instantaneous vehicle speed and derived cruise speed and determining whether the derived deviation exceeds a second predetermined deviation limit the fourth means providing a second signal when it is determined that the deviation exceeds the second predetermined deviation limit the second predetermined deviation limit being greater than the first predetermined deviation limit;
   e) fifth means responsive to the first signal from the third means for providing a lock-up inhibit signal for a lock-up device installed in a torque converter associated between a vehicular engine and the automatic transmission so as to inhibit the lock-up state of the lock-up device; and
   f) sixth means responsive to the second signal from the fourth means for providing a maximum speed range inhibit signal for the automatic transmission so as to inhibit a maximum gear range position of the automatic transmission.

2. A system as set forth in claim 1, which further comprises seventh means for providing a third signal for the lock-up device so as to release the lock-up inhibit of the lock-up device and thereafter provide a fourth signal for a gear-shift device of the automatic transmission so as to release the maximum speed range inhibit of the lock-up device when the vehicle speed is controlled to return to the desired cruise speed by means of the fifth and sixth means.

3. A system as set forth in claim 1, wherein the third and fourth means are incorporated in a single first control unit and the fifth and sixth means are incorporated in a single second control unit.

4. A system as set forth in claim 3, wherein the second control unit is associated with a control valve of the automatic transmission.

5. A system as set forth in claim 2, wherein the first and second deviation limits are derived from a calculation which subtracts the instantaneous vehicle speed from the desired cruise speed.

6. A system as set forth in claim 5, wherein the first predetermined deviation limit is a lock-up allowance limit speed deviation and the second predetermined deviation is an OD (Over Drive) allowance limit speed deviation.

7. A system as set forth in claim 6, wherein the third means includes eighth means for determining whether a lock-up device installed in the torque converter is presently inhibited via the fifth means and wherein the third means provides the first signal when the eighth means determines that the lock-up device is not presently inhibited and the derived deviation exceeds the first predetermined deviation limit.

8. A system as set forth in claim 7, wherein the fourth means includes ninth means for determining whether OD is being inhibited via the sixth means, wherein the seventh means includes tenth means for determining whether the derived deviation exceeds a third predetermined deviation limit, and wherein the fourth means provides the second signal when the lock-up inhibit signal is provided and OD is not being inhibited, when the derived deviation does not exceed the third predetermined deviation limit and said derived deviation exceeds the second deviation limit.

9. A system as set forth in claim 8, wherein the seventh means provides a third signal for the fifth means so as to release the lock-up inhibit of the lock-up device, when the lock-up release signal is provided and the OD release signal is not provided, and the derived deviation reduces below the third predetermined deviation limit.

10. A system as set forth in claim 9, wherein the seventh means includes eleventh means for determining whether the derived deviation exceeds a fourth predetermined deviation limit, the fourth predetermined deviation limit being greater than the third predetermined deviation limit, and wherein the seventh means provides a fourth signal for the sixth means so as to release the OD inhibit when the lock-up inhibit signal is provided, the OD inhibit signal is provided, and the derived deviation reduces below the fourth predetermined deviation limit.

11. A system as set forth in claim 10, wherein the third predetermined deviation limit is a lock-up return limit speed deviation and the fourth predetermined deviation limit is an OD return limit speed deviation, both of the third and fourth predetermined deviation limits being different from either of the first or second predetermined deviation limits.

12. A system as set forth in claim 11, wherein the third and fourth predetermined deviation limits fall within a range defined by the first and second predetermined deviation limits.

13. A system as set forth in claim 12, wherein when the sixth means provides the maximum speed range inhibit signal, the automatic transmission downshifts into a third speed gear range.

14. A system as set forth in claim 13, wherein the automatic transmission shifts up to the maximum speed gear range, i.e., fourth speed gear range upon receipt of the fourth signal provided by the seventh means.

15. A system as set forth in claim 1, wherein the first means includes an actuator for actuating a vehicular engine driving force adjusting mechanism in response to a control command and a command switch for providing a command signal to transmit the control command to the actuator for setting the vehicle speed at the desired cruise speed so that the vehicle speed coincides with and is maintained at the cruise speed.

16. A method for automatically controlling a vehicle speed to a desired cruise speed using an automatic transmission and torque converter, comprising the steps of:
  a) operatively controlling a vehicle speed to a desired cruise speed so that the vehicle speed coincides with the desired cruise speed;
  b) detecting an instantaneous vehicle speed;
  c) deriving a deviation between the instantaneous vehicle speed and the desired cruise speed during operation in step a),
  d) determining whether the derived deviation exceeds a first predetermined deviation limit,
  e) providing a first signal when it is determined that the second deviation exceeds the second predetermined deviation limit;
  f) determining whether the derived deviation exceeds a second predetermined deviation limit;
  providing a second signal when it is determined that the second deviation exceeds the second predetermined deviation limit, the second predetermined deviation limit being greater than the first predetermined deviation limit;
  h) in response to the first signal provided in step e), providing a lock-up inhibit signal for a lock-up device installed in the torque converter associated between a vehicular engine and the automatic transmission so as to inhibit the lock-up state of the lock-up device; and
  i) in response to the second signal provided in step g), providing a maximum speed range inhibit signal for the automatic transmission so as to inhibit a maximum gear range position of the automatic transmission.

17. A system for controlling a vehicle speed of an automotive vehicle in which an automatic transmission is mounted in association with an engine, comprising:
  a) first means, having an engine driving force adjusting mechanism in the engine, for operatively controlling the engine driving force to maintain the vehicle speed at a cruise speed set through a cruise switch;
  b) second means for detecting the vehicle speed;
  c) third means for deriving a deviation of the instantaneous vehicle speed from the set cruise speed during the operation of the first means;
  d) fourth means for providing at least two deviation limits, a second deviation limit being larger than a first deviation limit:
  e) fifth means for determining whether the vehicle speed drops and the deviation exceeds the first deviation limit:
  f) sixth means for providing a firs signal when the deviation exceeds the first deviation limit;
  g) seventh means responsive to the first signal for providing a lock-up inhibit signal for a lock-up device installed in a torque converter to inhibit the lock-up state of the lock-up device;
  h) eighth means for providing a second signal when the deviation exceeds the second deviation limit in the lock-up inhibit state of the lock-up device; and
  i) ninth means responsive to the second signal from the eighth means for providing a maximum gear speed range inhibit signal for the automatic transmission so as to inhibit a maximum gear shift range of the automatic transmission, thereby downshifting the automatic transmission to a lower gear range.

* * * * *